United States Patent
Shin et al.

(10) Patent No.: US 6,630,961 B1
(45) Date of Patent: Oct. 7, 2003

(54) DEINTERLACING DEVICE AND METHOD

(75) Inventors: Chang Yong Shin, Seoul (KR); Dong Il Han, Seoul (KR)

(73) Assignee: LG Electronics Inc., Seoul (KR)

( * ) Notice: Subject to any disclaimer, the term of this patent is extended or adjusted under 35 U.S.C. 154(b) by 469 days.

(21) Appl. No.: 09/608,219

(22) Filed: Jun. 30, 2000

(30) Foreign Application Priority Data

Jun. 30, 1999 (KR) ........................................ 1999-26084
Jul. 10, 1999 (KR) ........................................ 1999-27913

(51) Int. Cl.$^7$ .............................................. H04N 7/01
(52) U.S. Cl. ........................................ 348/448; 348/452
(58) Field of Search ................................ 348/448, 451, 348/452, 458, 459, 441; H04N 7/01

(56) References Cited

U.S. PATENT DOCUMENTS

| | | | |
|---|---|---|---|
| 5,475,438 A | * 12/1995 | Bretl | 348/452 |
| 5,943,099 A | * 8/1999 | Kim | 348/448 |
| 6,181,382 B1 | * 1/2001 | Kieu et al. | 348/459 |
| 6,396,543 B1 | * 5/2002 | Shin et al. | 348/452 |
| 6,466,269 B1 | * 10/2002 | Someya et al. | 348/448 |

* cited by examiner

*Primary Examiner*—Michael H. Lee
(74) *Attorney, Agent, or Firm*—Birch, Stewart, Kolasch & Birch, LLP

(57) ABSTRACT

A deinterlacing device and method for improving a quality of image after interpolation without a complicated circuit at the time when an interlacing screen is converted into a progressive type screen is disclosed. The deinterlacing device includes: a field memory for storing m continuous field data containing an nth field data and positioned before and after the nth field data on the basis of the nth field data of a plurality of field data for output image; a motion determination part for detecting picture element values and brightness profile pattern difference values in specific lines existing among the field data stored in the field memory to calculate a motion value of a moving picture; a spatial interpolator for calculating a variation direction of picture element values on an area to be interpolated in the nth field data to output a direction value; a time interpolator for averaging the picture element values on the area to be interpolated in a previous field data of the nth field data and the picture element values on the area to be interpolated in a next field data of the nth field data to output the picture element average value; and a soft switch for mixing the direction value outputted from the spatial interpolator and the picture element average value outputted from the time interpolator, based upon the motion value determined in the motion determination part to output the mixed result.

17 Claims, 14 Drawing Sheets odd field    even field

———— existence of data
------ non-existence of data

|  -1 |  -2 |  -1 |
| --- | --- | --- |
|     |  ○  |     |
|   1 |   2 |   1 |

|  -1 |     |   1 |
| --- | --- | --- |
|  -2 |  ○  |   2 |
|   1 |     |   1 |

DEINTERLACING DEVICE AND METHOD

BACKGROUND OF THE INVENTION

1. Field of the Invention

The present invention relates to an image processing method, and more particularly, to a deinterlacing device and method capable of converting interlace field image data into a progressive frame image data.

2. Discussion of Related Art

Interlacing image data is displayed on one frame of screen composed of two fields, i.e., an odd field and an even field, as shown in FIG. 1.

However, some types of displays do not process the interlacing image data but they process a progressive image data which is used on a monitor of a computer, instead. In this case, there is a need to install an additional system for converting the interlacing image data into the progressive image data in the interior of the display.

A method for converting the interlacing image data into the progressive image data is embodied in various ways, as shown in FIGS. 2a to 2c.

As to a line repetition method, as shown in FIG. 2a, one frame is made in such a manner that the line information of a current field is simply repeated. The line repetition method is realized with a simple hardware but has a defect that a quality of image is deteriorated after interpolation.

As to an inter-field interpolation without motion-compensation method, as shown in FIG. 2b, one frame is made in such a manner that a previous field line is inserted between current field lines. The inter-field interpolation without motion-compensation method is realized with a simple hardware but has a defect that even if the motion image is interpolated, an error is generated or a screen is degraded, thereby causing a quality of image to be deteriorated.

As to an intra-field interpolation, as shown in FIG. 2c, one frame is made in such a manner that into the area between two lines in one field the data made by dividing the two line data into two is inserted. The intra-field interpolation obtains a relatively vivid quality of image when compared with the line repetition method and exhibits a lower error generation than the inter-field interpolation without motion-compensation method. However, it has a defect that after the interpolation of still image, the screen is degraded, thereby causing a quality of image to be deteriorated.

As another interpolation method, there is presented a current screen interpolation method using the field data of a previous screen and the field data of a screen to be displayed. Particularly, this method detects the points where motion occurs on the screen by using four continuous field data on the basis of a current field data and interpolates the current frame screen in accordance with the motion detection result. Generally, the interpolation of the current frame screen is carried out by using two previous field data, the current field data and the next field data. However, in case of the screen where the motion speed is relatively fast when compared with the period of each field to be interpolated, it has a defect that the interpolation is difficult or has been erroneously executed.

As described above, such the conventional methods for converting the interlacing image data into the progressive image data suffer the problem that the quality of image is poor after the interpolation or the interpolation is erroneously executed.

To solve this problem, there are presented a "Bernard" method disclosed in U.S. Pat. No. 5,027,201 and a "Faroudja" method disclosed in U.S. Pat. No. 5,159,451, which overcome the deterioration of the quality of image after the interpolation. However, these methods suffer a problem that a manufacturing cost of a circuit is expensive due to a plurality of field memories and a relatively complicated procedure.

SUMMARY OF THE INVENTION

It is, therefore, an object of the invention to provide a deinterlacing device and method capable of improving a quality of image after interpolation, without having a complicated circuit configuration, at the time when an interlacing screen is converted into a progressive type screen.

It is another object of the invention to provide a deinterlacing device and method capable of interpolating a field screen, based upon picture elements positioned in a diagonal direction to a picture element to be interpolated.

It is still another object of the invention to provide a deinterlacing device and method capable of detecting motion information of a field and carrying out interpolation in accordance with the motion and edge direction.

It is yet another object of the invention to provide a deinterlacing device and method capable of detecting a brightness difference among picture elements positioned on a predetermined area in vicinity of the picture element to be interpolated to thereby carry out the interpolation for a field screen.

According to an aspect of the present invention, there is provided a deinterlacing device comprising: a field memory for storing m continuous field data containing an nth field data and positioned before and after the nth field data on the basis of the nth field data of a plurality of field data for output image; a motion determination part for detecting picture element values and brightness profile pattern difference values in specific lines existing among the field data stored in the field memory to calculate a motion value of a moving picture; a spatial interpolator for calculating a variation direction of picture element values on an area to be interpolated in the nth field data to thereby output a direction value; a time interpolator for averaging the picture element values on the area to be interpolated in a previous field data of the nth field data and the picture element values on the area to be interpolated in a next field data of the nth field data to thereby output the picture element average value; and a soft switch for mixing the direction value outputted from the spatial interpolator and the picture element average value outputted from the time interpolator, based upon the motion value determined in the motion determination part to thereby output the mixed result.

The motion determination part is, preferably, comprised of a brightness difference and brightness profile pattern difference (hereinafter, which is referred simply to BD and BPPD) detector for calculating the brightness difference and the brightness profile pattern difference in the field data and a BD and BPPD combiner for carrying out the mapping to a predetermined set value, if the brightness difference and the brightness profile pattern difference are over a predetermined limit value, to thereby measure the motion value.

The deinterlacing device further comprises a median filter for grouping the motion values calculated in the motion determination part and a motion expander for expanding the motion value from the picture elements having motion on the specific line to adjacent picture elements in accordance with the motion value grouped in the median filter to thereby output the expanded motion value to the soft switch.

The deinterlacing device further comprises a vertical line converter for converting the number of vertical lines on the nth field screen, based upon the output value of the soft switch and the field data values stored in the field memory.

The spatial interpolator detects the edge direction of a picture element to be currently interpolated, based upon the field data values stored in the field memory and averages the picture element values of the adjacent picture elements to the picture element for which the edge direction is detected to thereby determine a picture element value to be interpolated.

According to another aspect of the present invention, there is provided a deinterlacing method comprising the steps of: storing m field data corresponding to an interlacing type broadcasting program image; detecting picture element values on a predetermined area in which a picture element to be interpolated is contained in the field data; detecting a variation direction of the picture element values on the predetermined area; calculating an interpolation value, based upon the variation direction of the picture element values; and interpolating a current field data with the calculated interpolation value.

The step of detecting the variation direction of the picture element values comprises the steps of: detecting picture element values in the vicinity of an edge of a first area in which the picture element to be interpolated is contained; shifting the first area at predetermined intervals to continuously detect the picture element values in the vicinity of the edge shifted; calculating a variation amount of the picture element values continuously detected; and sensing the variation direction of the picture element values, based upon the variation amount of the picture element values.

The step of continuously detecting the picture element values comprises the steps of: setting a first observation window on a part of an upper line of a line in which the picture element to be interpolated is contained and setting a second observation window on a part of a lower line thereof; and shifting the first and second observation windows at predetermined intervals to detect the picture element values on the edge in each observation window.

The step of interpolating the current field data with the calculated interpolation value comprises the steps of: linearly interpolating the picture element value of each picture element contained in a second area in which the picture element to be interpolated is contained between adjacent picture elements; replacing the picture element value interpolated between the adjacent picture elements between the adjacent picture elements; calculating a difference between two arbitrary picture element values in the picture elements within the second area; calculating a minimum value of the difference values; setting an interpolation area in which the two picture elements having the minimum value are contained; and calculating an average value of all picture element values contained in the interpolation area as the interpolation value and interpolating the current field data with the calculated interpolation value.

BRIEF DESCRIPTION OF THE ATTACHED DRAWINGS

DETAILED DESCRIPTION OF PREFERRED EMBODIMENT

Figure 1A:
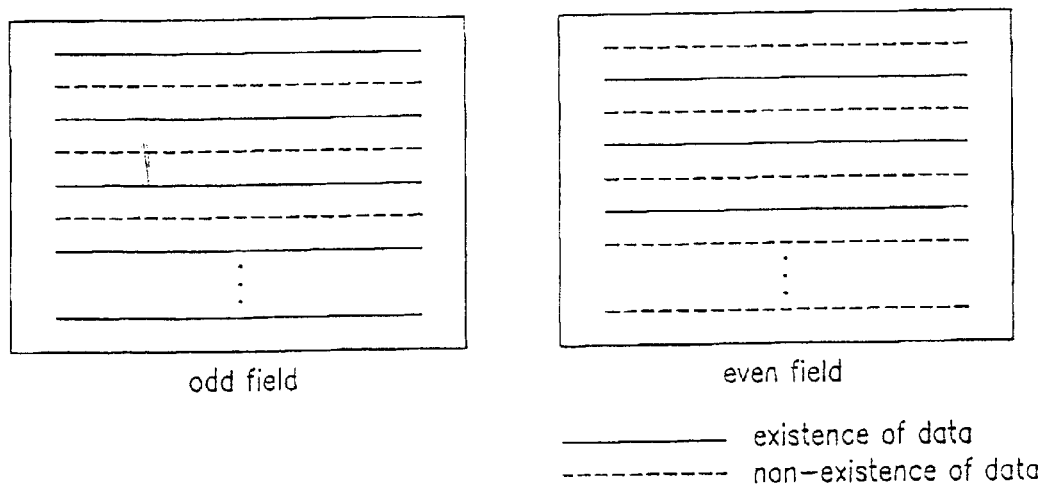
FIG. 1 is an exemplary view illustrating a screen where a general interlacing method is applied.
Figure 2A:
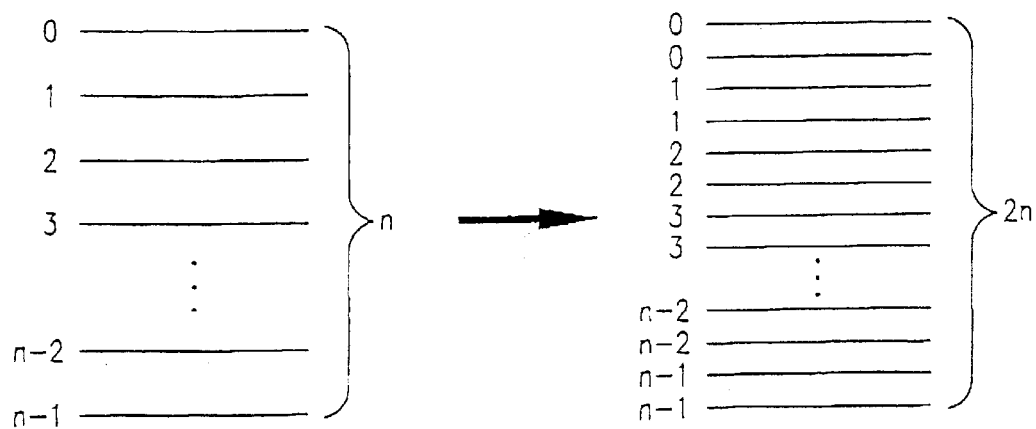
FIGS. 2a to 2c are exemplary views illustrating conventional interpolation methods.
Figure 2B:
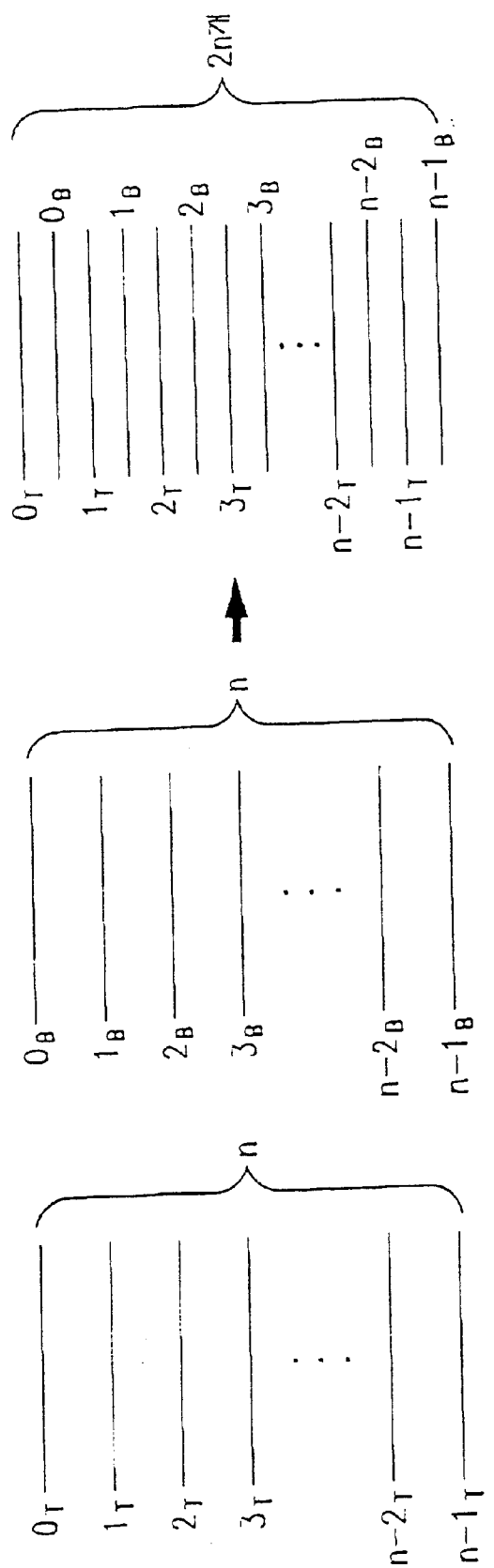
Figure 2C:
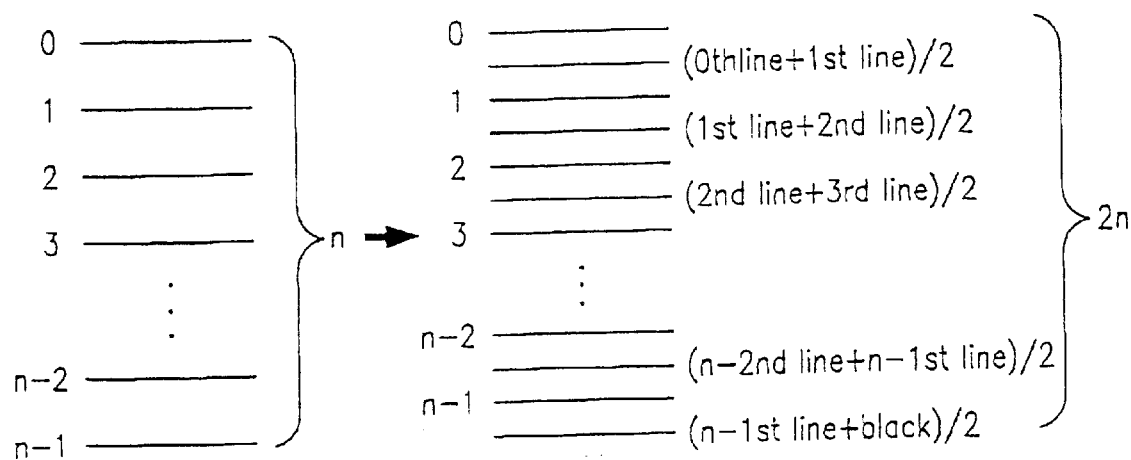
Figure 3:
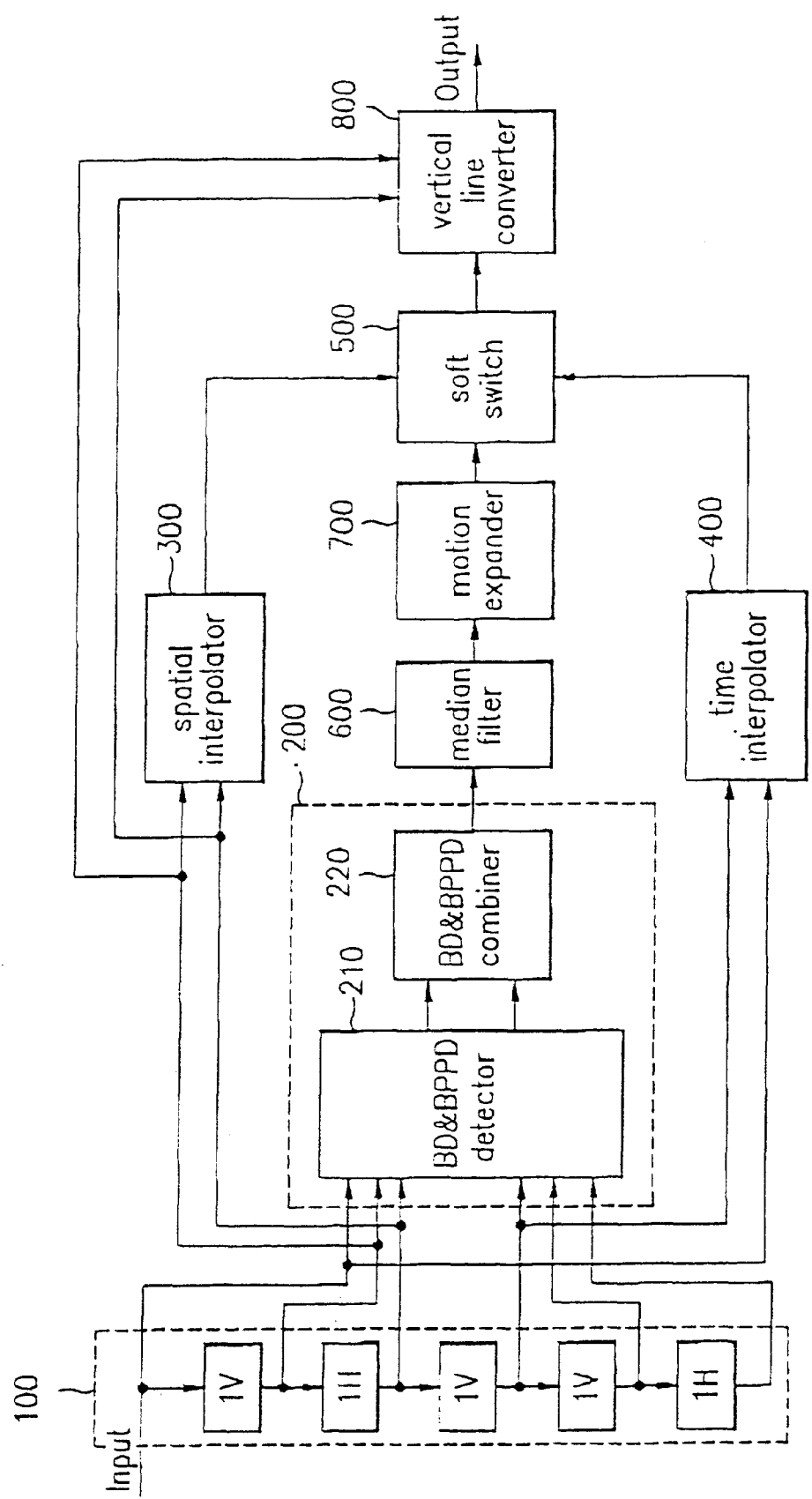
FIG. 3 is a schematic block diagram illustrating the construction of a deinterlacing device according to the present invention.

FIG. 3 is a schematic block diagram illustrating the construction of a deinterlacing device according to the present invention.

In construction, a field memory 100 stores m continuous field image data containing a current field data (i.e., an nth field data), a previous field data, a next field data and the like, on the basis of the nth field data of a plurality of field data for output image. In other words, the field memory 100 stores the nth field data and the previous and next field data to the nth field data.

A motion determination part 200 detects the picture element values and brightness profile pattern difference values in specific lines existing among the field data stored in the field memory 100 to thereby calculate a motion value of a moving picture.

The motion determination part 200 is comprised of a brightness difference and brightness profile pattern difference (hereinafter, which is referred simply to BD and BPPD) detector 210 for calculating the brightness difference and the brightness profile pattern difference in the field data and a BD and BPPD combiner 220 for carrying out the mapping to a predetermined set value, if the brightness difference and the brightness profile pattern difference are over a predetermined limit value, to thereby measure the motion value.

The term "brightness difference" is widely used in various fields such as a digital TV or the like, for line interpolation, but the term "brightness profile pattern difference" introduced for deinterlacing has been firstly proposed in Korean Patent Application No. 09/224,049 filed by the same applicant as in the invention.

Figure 5:
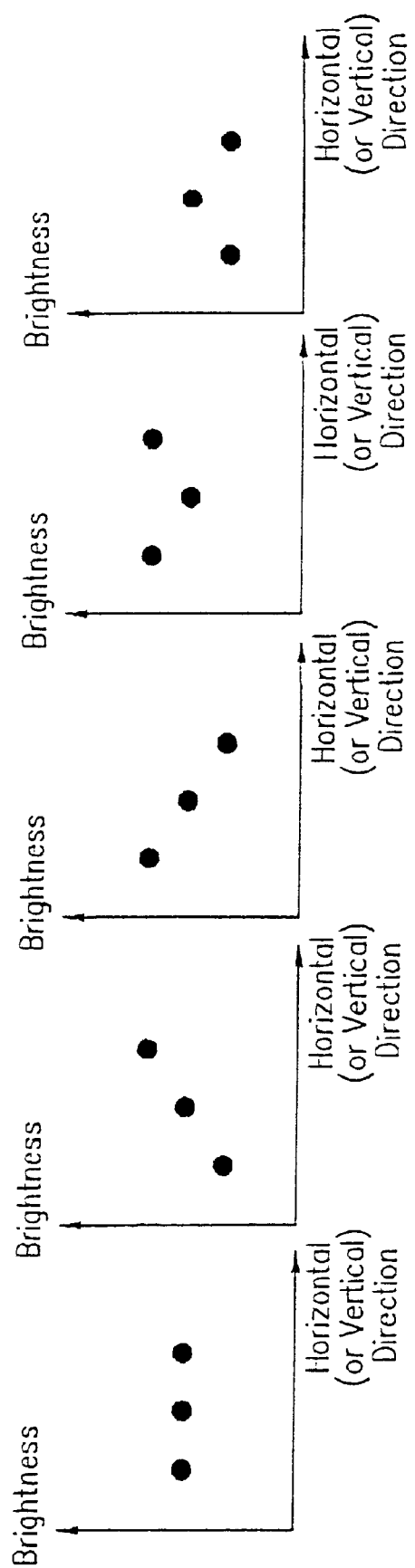
FIG. 5 is a coordinate diagram illustrating all of cases where the brightness profile patterns are formed.

FIG. 5 is a coordinate diagram illustrating various types of brightness profile pattern, for the explanation of the concept of the brightness profile pattern difference. With such types of brightness profile pattern, as shown, a method for calculating the brightness profile pattern difference and a method for calculating the existing brightness difference are embodied by the following mathematical expressions.

Figure 4:
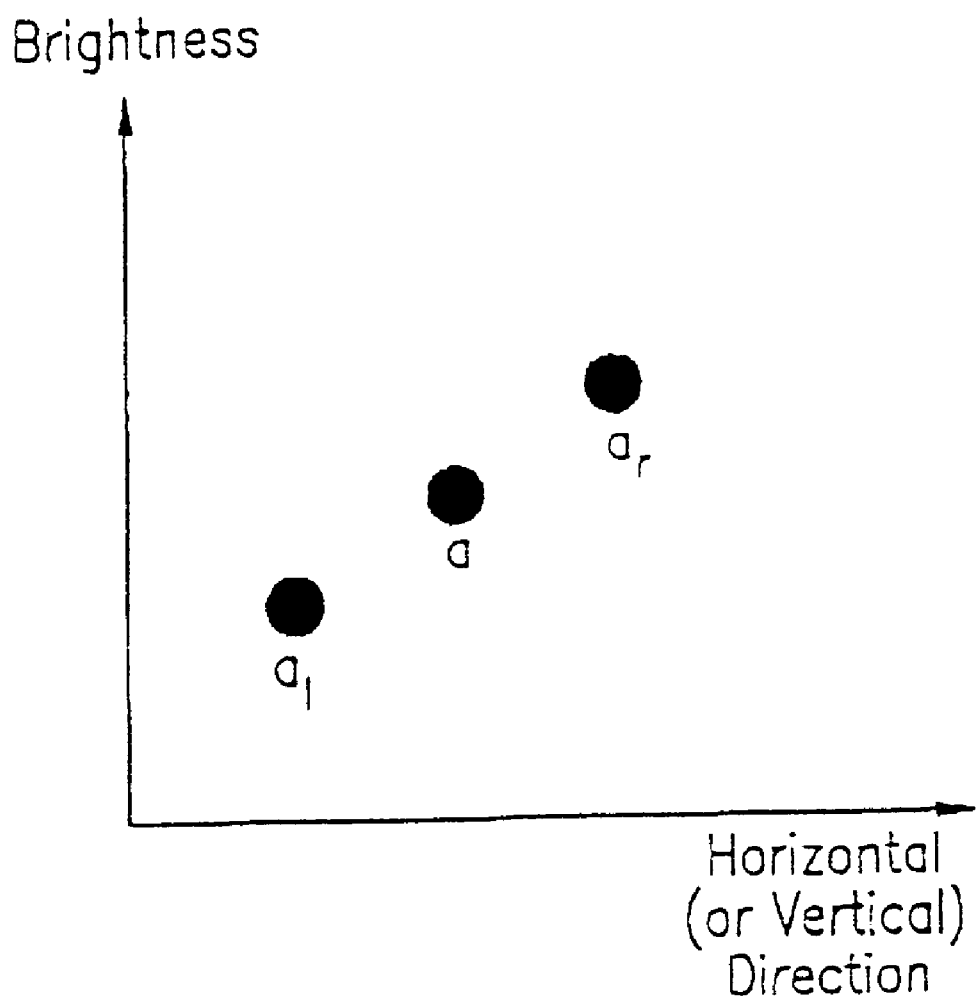
FIG. 4 is a coordinate diagram illustrating a brightness profile pattern used in the present invention.

Assuming that the brightness of a picture element a at an arbitrary time Ti is set as Ba, a quantitative display of the brightness profile pattern shown in FIG. 4 is obtained by the following mathematical expression (1).

$$P_{al}^{i}=B_{a}^{i}-B_{al}^{i}, P_{ar}^{i}=B_{a}^{i}-B_{ar}^{i} \quad (1)$$

Figure 6:
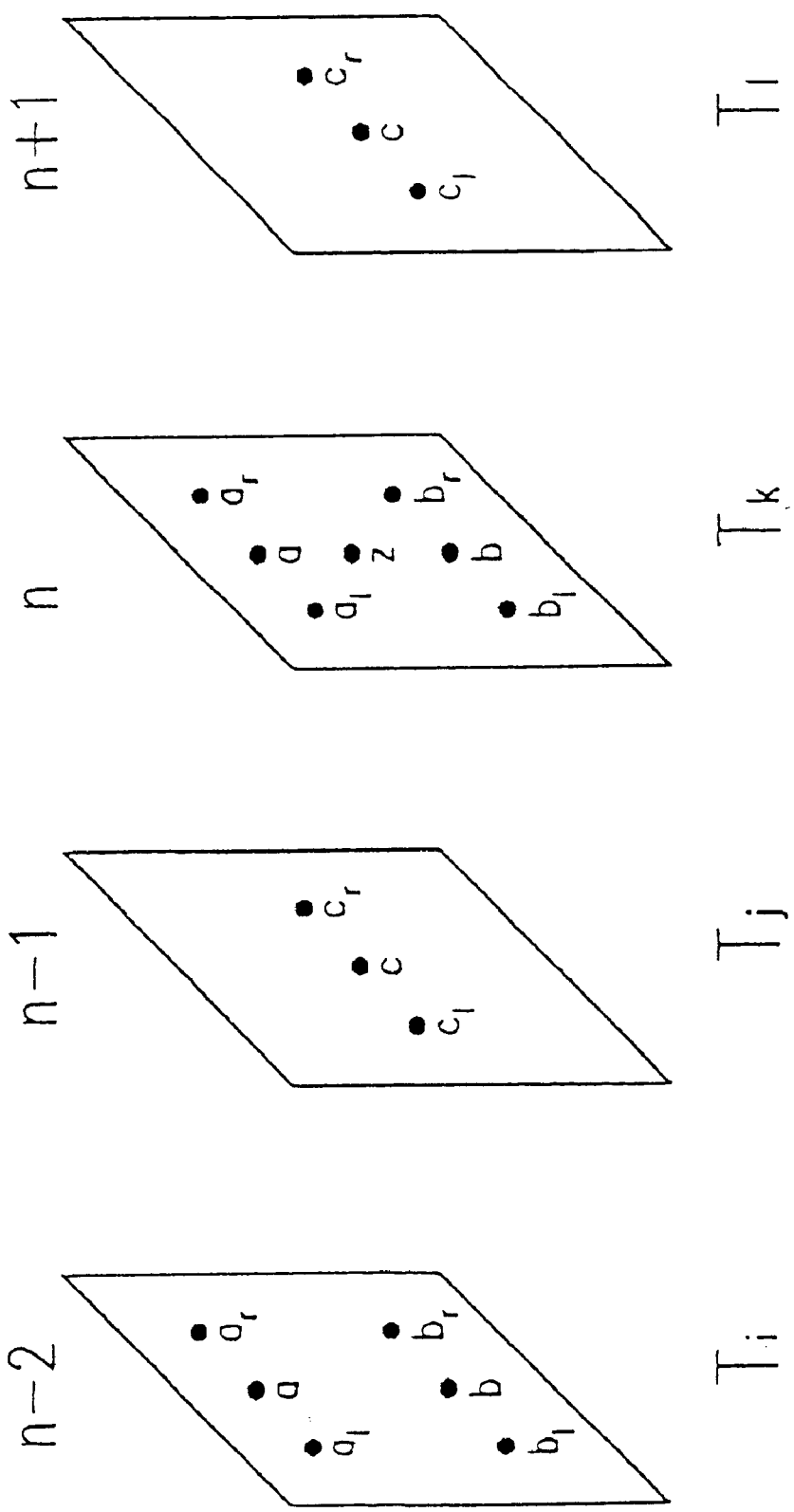
FIG. 6 is an exemplary view illustrating line interpolation using four fields.

The quantification of the brightness profile pattern is carried out for several lines to be line-interpolated. With the quantificated value, the brightness profile pattern difference and the brightness difference are calculated. FIG. 6 shows four continuous fields used for the quantification of the brightness profile pattern.

First, the motion determination part 200 in the deinterlacing device of the present invention extracts the brightness profile pattern of an n−2th field data by using the picture element values of the n−2th field data with the mathematical expression 1. In other words, the profile pattern is detected at the time Ti when the n−2th field is inputted.

Then, the motion determination part 200 extracts the brightness profile pattern of an nth field data by using the picture element values of the nth field data with the mathematical expression 1. In other words, the profile pattern is detected at the time Tk when the nth field is inputted.

If the brightness profile pattern of the n−2th field and the brightness profile pattern of the nth field are all extracted, the brightness profile pattern difference, i.e. the BPPD, between the n−2th field and the nth field is detected with the following mathematical expression (2).

$$Pd_{a}^{ik}=|P_{al}^{i}-P_{al}^{k}|+|P_{ar}^{i}-P_{ar}^{k}| \quad (2)$$

And, the brightness difference between the n−2th field and the nth field is detected with the following mathematical expression (3).

$$Bd_{a}^{ik}=|B_{a}^{i}-B_{a}^{k}| \quad (3)$$

With the application of the above-mentioned detecting procedure, the brightness profile pattern difference and brightness difference between an n−1th field and an n+1th field are detected with the following mathematical expressions (4) and (5).

$$Pd_{c}^{jl}=|P_{cl}^{j}-P_{cl}^{l}|-|P_{ar}^{j}-P_{ar}^{l}| \quad (4)$$

$$Bd_{c}^{jl}=|B_{c}^{j}-B_{c}^{l}| \quad (5)$$

The deinterlacing device of the present invention further comprises a median filter 600 for filtering noise components in the output values from the BD and BPPD combiner 220 of the motion determination part 200 and for grouping the filtered values; and a motion expander 700 for expanding the motion value from the picture element having motion to adjacent picture elements in accordance with the output value of the BD and BPPD combiner 220.

The image transmitted by a broadcasting signal is unavoidably mixed to noises upon coding and transmission. Therefore, the median filter 600 eliminates the noise components and groups the areas on which the image having motion is detected.

The motion expander 700 expands the motion value outputted in the median filter 600 to adjacent picture elements.

The reason why the motion expander 700 expands the motion value outputted in the median filter 600 to the adjacent picture elements is as follows. Generally, the motion of moving picture is not conducted only on a specific picture element, but conducted on the picture element groups on a predetermined area. Therefore, if the motion value is sensed on the specific picture element, the motion may be caused by the noise components of the specific picture element, or the specific picture element and the adjacent picture elements thereof are in a motion state. In this case, since the motion value corresponding to the noise components has been eliminated by the median filter 600, there is a possibility that the specific picture element and the adjacent picture elements thereof are in a motion state. Therefore, the motion expander 700 expands the motion value outputted from the median filter 600 to the surrounding of the picture element on which the motion value is detected.

The spatial interpolator 300 detects the picture element values of the nth field data corresponding to the area on which the line interpolation is carried out and adjacent picture elements within the field and calculates a direction of the edge on which the picture element values adjacent to the picture elements to be interpolated are contained, thereby extracting an interpolation value based upon the calculated edge direction. For example, if a kth line is interpolated to newly form the nth field image, the spatial interpolator 300 detects the picture element values of the image data of a k−1th line and the image data of a k+1th line and calculates the direction of edge on which the detected picture element values are contained, thereby extracting the interpolation value based upon the calculated edge direction. Also, the spatial interpolator 300 may detect an interpolation direction of an edge value on which the picture element to be interpolated on the inputted image is contained.

Specifically, the spatial interpolator 300 of the deinterlacing device according to the present invention filters the picture element values of the picture elements adjacent spatially to the picture element to be interpolated and the picture element values adjacent by time to the current field of the picture element to be interpolated in order for the picture element to be interpolated to maintain space and time consistency thereof, thereby extracting the interpolation value of the picture element to be interpolated.

The extraction of the interpolation value of the spatial interpolator 300 of the present invention is carried out by a 'region matching method' or a 'direction extraction method by gradient and rule'. Alternatively, the interpolation value may be extracted by combining the region matching method with the direction extraction method by gradient and rule.

As an example, the spatial interpolator 300 of the present invention detects the edge direction of the picture element to be interpolated using the direction extraction method by gradient and rule; and then detects the interpolation value of the picture element for which the edge direction has been detected using the region matching method.

(Edge Direction Extraction Method by Gradient and Rule)

Figure 9:
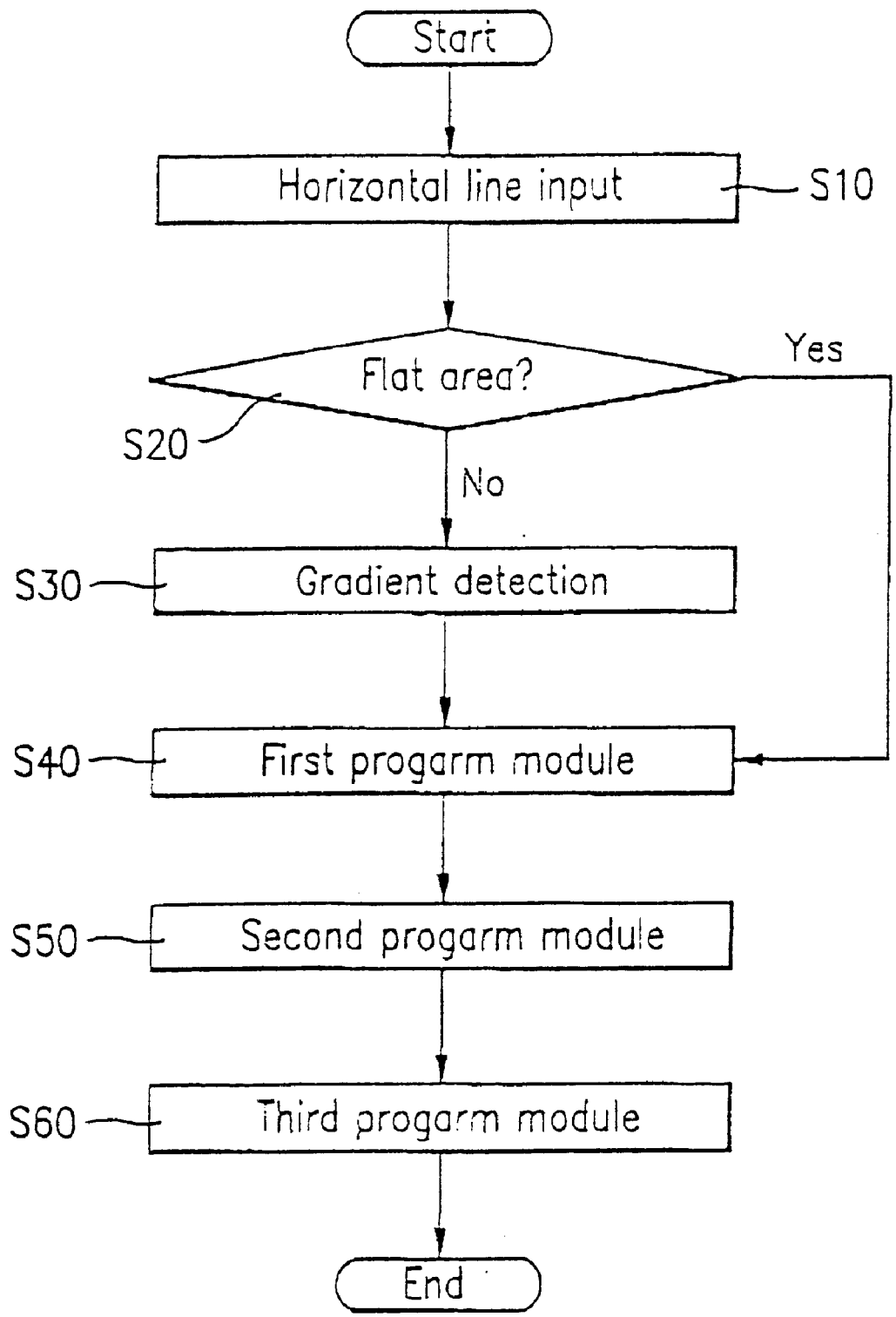
FIG. 9 is a flow chart illustrating a method for detecting the variation direction of picture element values by gradient and rule.

FIG. 9 is a flow chart illustrating a method for detecting the edge direction of picture element values by gradient.

For detecting the edge direction by gradient, firstly horizontal line image data are inputted at step S10 and then, it is determined whether the horizontal line image data are on a flat area at step S20. The determination is made by the following procedure.

Figure 10:
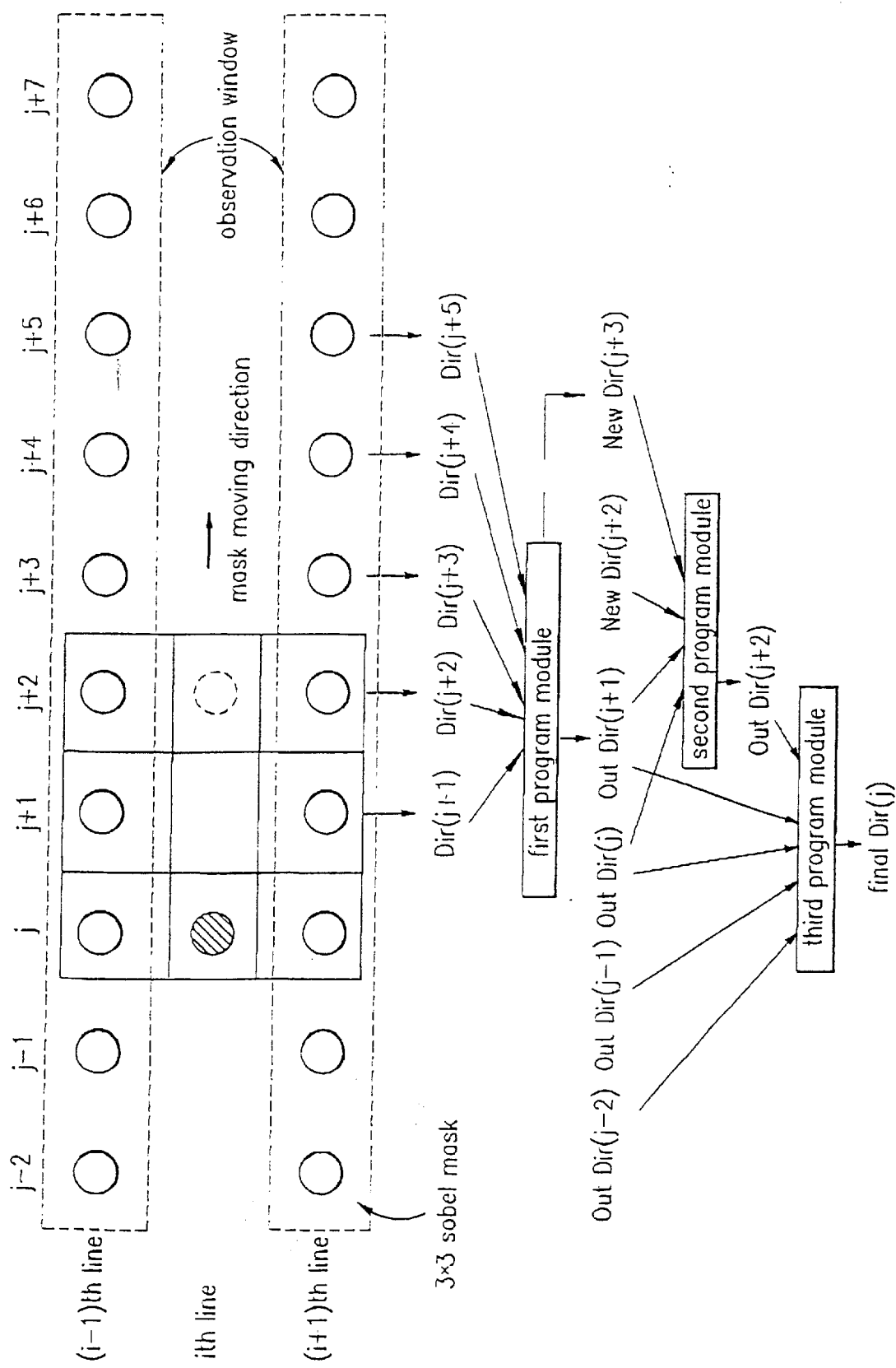
FIG. 10 is an exemplary view illustrating an operation of detecting the variation direction of an ith picture element value in an edge direction, in which a jth picture element of an i+1th line is contained.

As shown in FIG. 10, in case of calculating the variation direction of a jth picture element value on an ith line, a procedure of determining whether the jth picture element on the ith line is on the flat area is taken as follows.

The picture element value differences in horizontal and vertical directions between the picture element values adjacent to the jth picture element on an i−1th line and the picture element values adjacent to the jth picture element on an i+1th line are firstly obtained. A maximum value in the difference values is calculated and then compared with a predetermined threshold value. If the maximum value is lower than the predetermined threshold value, it is determined that the jth picture element on the ith line is in the flat area. By contrast, if higher, it is determined that the jth picture element on the ith line is not in the flat area.

At this time, in the flat area the edge direction of the picture element value is considered to be 0° in the vertical direction and the horizontal direction.

If the edge direction of the picture element values is not in the flat area, the gradient of the picture element values is calculated by using a 3×3 mask as shown in FIG. 10, at step S30. The preferred embodiment of the present invention uses a sobel mask, but may use various masks, depending upon application. The sobel mask sets a part of the observation windows set on the upper and lower lines of the picture element to be interpolated as a predetermined operator area and calculates the gradient of the picture element value, based upon a predetermined extra weight value given to the picture elements positioned in the operator area.

Figures 11A, 11B, 12:
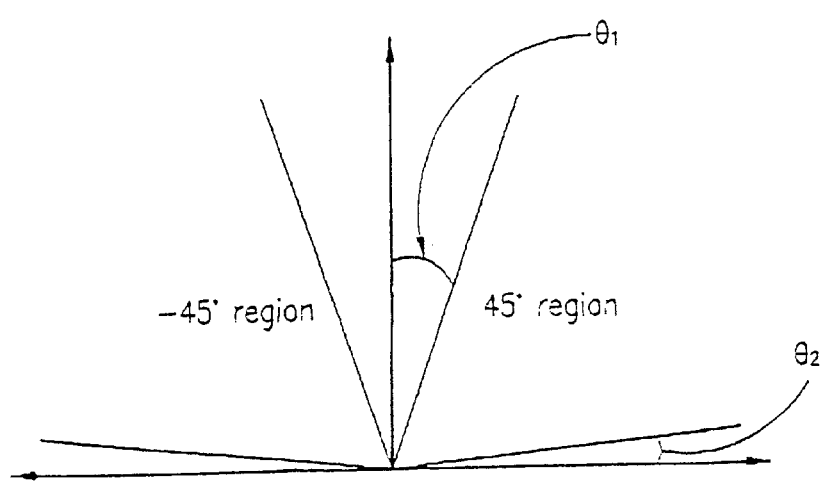
FIG. 11a is a detailed view of a sobel mask used for obtaining a variation amount of picture element values in the direction of an axis 'y'.
FIG. 11b is a detailed view of a sobel mask used for obtaining a variation amount of picture element values in the direction of an axis 'x'.
FIG. 12 is an exemplary view illustrating the mapping of an edge direction to a predetermined area.

FIG. 11*a* is a detailed view of a 3×3 sobel mask used for obtaining the gradient ($\Delta y$) of an axis 'y' of the picture element values, and FIG. 11*b* is a detailed view of a 3×3 sobel mask used for obtaining the gradient ($\Delta x$) of an axis 'x' of the picture element values.

The picture element values in the sobel mask is substituted in the mathematical expressions (6) and (7), thereby calculating the gradient of the picture element values.

$$\vec{G}[P_{y,x}] = \begin{pmatrix} G_x \\ G_y \end{pmatrix} = \begin{pmatrix} \frac{\partial P}{\partial x} \\ \frac{\partial P}{\partial y} \end{pmatrix} \quad (6)$$

$$a(y, x) = \tan^{-1}\left[\frac{G_y}{G_x}\right] \quad (7)$$

At this time, an angle 'a' is measured relative to the axis 'x'. Therefore, since the gradient direction is vertical to the edge direction, the edge direction '$a_e(y,x)$' is given by the following mathematical expression (8).

$$a_e(y,x)=90-a(y,x) \text{ if } a_e(y,x) \geq 0$$
$$a_e(y,x)=-90-a(y,x) \text{ if } a_e(y,x) < 0 \quad (8)$$

The value $a_e$ calculated from the above expression is an edge direction angle that is converted in consideration of the mapping to each area as shown in FIG. 12. For example, if the $a_e$ is 60°, the mapping to the area of 45° is carried out and if the $a_e$ is 89°, the mapping to the area of 0° is carried out.

The above procedure is carried out for j+1th, j+2, j+3, j+4, and j+5 pixels (picture elements), thereby calculating the direction values of the picture elements, Dir(j+1), Dir(j+2), Dir(j+3), Dir(j+4), and Dir(j+5). At this time, the picture element values of the picture elements, which are not contained in the inputted image within the sobel mask, are set as the linearly interpolated value in the vertical direction.

As a subsequent step, the direction values of the picture elements adjacent in the horizontal direction to the picture element for which the direction value is to be calculated are estimated, based upon the direction values of the above picture elements, at step S40. At this time, the estimating order may be given by the following first program module, for example.

```
                 * First Program Module *
if n(Dir 0°)>2, NewDir(j+3)=0°                                        1
else if n(Dir 45°)>3, NewDir(j+3) = 45°                               2
else if n(Dir −45°)>3, NewDir(j+3)=−45°                               3
else if [n(Dir 45°)=3] or [n(Dir −45°)=3]                             4
    if [(Dir(j+1)=Dir(j+3)=Dir(j+5)) and,
           {Dir(j+2)≠Dir(j+4) or (Dir(j+2)≠0°)}] or
       {(Dir(j+1)=Dir(j+2)=Dir(j+5)) and, (Dir(j+3)≠0°)} or
       {(Dir(j+1)=Dir(j+4)=Dir(j+5)) and, {Dir(j+3)≠0°)} or
       {(Dir(j+1)=Dir(j+3)=0°) and,
           (Dir(j+2)=Dir(j+4)=Dir(j+5))} or
       {(Dir(j+1)=Dir(j+2)=Dir(j+4)) and,
           (Dir(j+3)=Dir(j+5)≠0°)},
           NewDir(j+3) = 0°                                           5
    else if n(Dir 45° =3) and, NewDir(j+3) = 45°                      6
    else NewDir(j+3) = −45°                                           7
else
    if {(Dir(j+2)=Dir(j+4)) and, (Dir(j+1)≠Dir(j+3))
           and, (Dir(j+3)≠Dir(j+5)},
           NewDir(j+3) = Dir(j+2)                                     8
    else if {(Dir(j+2)=45° and, Dir(j+3)=−45°)} or
       {(Dir(j+2)=−45° and, Dir(j+3)=45°)} or
       {(Dir(j+3)=45° and, Dir(j+4)=−45°)} or
       {(Dir(j+3)=−45° and, Dir(j+4)=45°)},
           NewDir(j+3)=0°                                             9
    else NewDir(j+3)=Dir(j+3)                                        10
end if
```

In the above program, n(Dir a) means the number of picture elements having the direction value of a.

An explanation of the operation principles of the first program module will be hereinafter discussed.

If the number of picture elements having the direction value of 0° is over 2, the direction value (NewDir(j+3)) of the next picture element of the picture element (j+2th picture element) to be currently interpolated is set as 0° (case 1). If the number of picture elements having the direction value of 45° is over 3, the direction value (NewDir(j+3)) of the next picture element of the picture element to be currently interpolated is set as 45° (case 2). If the number of picture elements having the direction value of −45° is over 3, the direction value (NewDir(j+3)) of the next picture element of the picture element (j+2th picture element) to be currently interpolated is set as −45° (case 3).

On the other hand, if the number of picture elements having the direction value of 45° or −45° is 3 (case 4), the direction value (NewDir(j+3)) of the next picture element of the picture element (j+2th picture element) to be currently interpolated is set as follows.

If the previous picture element (j+1th picture element) to the picture element to be currently interpolated, the next picture element (j+3th picture element) thereto and the picture element (j+5th picture element) in a third order therefrom have the same direction value and at the same time, if the picture element to be currently interpolated and the picture element (j+4th picture element) in a second order therefrom do not have the same direction, value, or otherwise, if the previous picture element (j+1th picture element) to the picture element to be currently interpolated, the next picture element (j+3th picture element) thereto and the picture element (J+5th picture element) in a third order therefrom have the same direction value and at the same time, it the direction value of the picture element to be currently interpolated is not 0°, the direction value (NewDir (j+3)) of the next picture element (j+3th picture element) is set as 0° (case 5).

As another case, if the previous picture element (j+1th picture element), the picture element:o be currently interpolated and the picture element (j+5th picture element) in a third order therefrom have the same direction value and at the same time, if the direction value of the next picture element (j+3th picture element) is not 0°, the direction value (NewDir(j+3)) of the next picture element (j+3th picture element) is set as 0° (case 5), As yet another case, if the previous picture element (j+1th picture element) to the picture element to be currently interpolated, the picture element (j+4th picture element) in the second order therefrom and the picture element (j+5th picture element) in the third order therefrom have the same direction value and at the same time, if the direction value of the next picture element (j+3th picture element) is not 0°, the direction value (NewDir(j+3)) of the text picture element (j+3th picture element) is set as 0° (case 5).

As another case, if the direction values of the previous picture element (j+1th picture element) and the next picture element (j+3th picture element) are not 0° and at the same time, if the picture element (j+2th picture element) to be currently interpolated, the picture element (j+4th picture element) in the second order therefrom and the picture element (j+5th picture element) in the third order therefrom have the same direction value, the direction value (NewDir(j+3)) of the next picture element (j+3th picture element) is set as 0° (case 5).

As yet another case, if the previous picture element (j+1th picture element) to the picture element to be currently interpolated, the picture element (j+2th picture element) to be currently interpolated and the picture element (j+4th picture element) in the second order therefrom have the same direction value and at the same time, if the next picture element (j–3th picture element) thereto and the picture element (j+5th picture element) in the third order therefrom have the same direction value under the condition where the direction value is not 0°, the direction value (NewDir(j+3)) of the next picture element (j+3th picture element) is set as 0° (case 5).

Also, if the number of picture elements having the direction value of 45° is 3 and in case of any other cases except the above-described cases 5 in the first program module, the direction value (NewDir(j+3)) of the next picture element of the picture element to be currently interpolated is set as 45° (case 6). And, if the number of picture elements having the direction value of –45° is 3 and in case of any other cases except the above-described cases 5 and 6 in the first program module, the direction value (NewDr(j+3)) of the next picture element of the picture element to be currently interpolated is set as –45° (case 7).

If the picture element (j+2th picture element) to be currently interpolated and the picture element (j+4th picture element) in the second order therefrom have the same direction value, at the same time if the previous picture element (j+1th picture element) and the next picture element (j+3th picture element) thereto do not have the same direction value, and at the same time if the next picture element (j+3th picture element) to the picture element to be currently interpolated and the picture element (j+5th picture element) in the third order therefrom do not have the same direction value, the direction value (NewDir(j+3)) of the next picture element (j+3th picture element) is set as the direction value of (Dir(j+2)) of the picture element to be currently interpolated (case 8).

If the direction value of (Dir(j+2)) of the picture element to be currently interpolated is 43' and the direction value (Dir(j+3)) of the next picture element is –45°, if the direction value of (Dir(j+2)) of the picture element to be currently interpolated is –45° and the direction value (Dir(j+3)) of the next picture element is 45°, if the direction value (Dir(j+3)) of the next picture element is 45° and the direction value of (Dir(j+4)) of the picture element in the second order therefrom is –45°, or if the direction value of the next picture element is –45° and the direction value of (Dir(j+4)) of the picture element in the second order therefrom is 45°, the direction value of the next picture element of the picture element to be currently interpolated is sec as 0° (case 9).

Finally, in case of any other cases except the cases 1 of 9, the direction value (NewDir(j+3)) of the next picture element of the picture element to be currently interpolated is used as Dir(j+3), without any change (case 10).

The spatial interpolator 300 of the present invention determines the direction value (OutDir(j+2)) of the current picture element by using the direction values (NewDir(j+3), NewDir(j+2), . . . ) calculated from the first program module and the direction values (0utDir(j) and OutDir(j+1)) of the previous picture elements to the current picture element, at step S50. At this time, the method for determining the direction value of the current picture element is carried out by the following second program module, for example.

---

\* Second Program Module \*

--- if {(OutDir(j+1)=NewDir(j+3) and, OutDir(j)≠NewDir(j+2)},
    OutDir(j+2)=OutDir(j+1)                                                                        1'
else if {OutDir(j)=NewDir(j+3)≠OutDir(j+1)=NewDir(j+2)} or
    [({(OutDir(j+1)=45°) and, (NewDir(j+2)=–45°)} or
    {(OutDir(j+1)=–45°) and, (NewDir(j+2)=45°)} and,
    (NewDir(j+2) ≠ NewDir(j+3))] or
    [{(NewDir(j+2)=45°) and, (NewDir(j+3)=–45°)} or,
    ((NewDir(j+2)=–45°) and, (NewDir(j+3)=45°)) and,
    (OutDir(j+1) ≠ NewDir(j+2))],
    OutDir(j+2) =0°                                                                            2'
else OutDir(j+2) = NewDir(j+2)                           3'
end if

---

Now, an explanation of the operation principles of the second program module will be hereinafter discussed.

If the set direction value (OutDir(j+1)) of the previous picture element to the picture element to be currently interpolated is equal to the direction value (NewDir(j+3)) of the next picture element and at the same time, if the set direction value (OutDir(j)) of the picture element in a second order before the picture element to be currently interpolated is equal to the direction value (NewDir(j+2)) of the picture element to be currently interpolated, the set direction value (0utDir(j+2)) of the picture element to be currently interpolated is determined as the set direction value (OutDir(j+1)) of the previous picture element (case 1').

As another case, if the set direction value (OutDir(j)) of the picture element in the second order before the picture element to be currently interpolated is equal to the direction value (NewDir(j+3)) of the next picture element, if the direction value (NewDir(j+3)) of the next picture element is different from the set direction value (OutDir(j+1)) of the previous picture element, and at the same tire if the set direction value (OutDir(j+1)) of the previous picture element is equal to the direction value (NewDir(j+2)) of the picture element to be currently interpolated, the set direction value (OutDir(j+2)) of the picture element to be currently interpolated is determined as 0° (case 2).

As still another case, of the set direction value (OutDir(j+1)) of the previous picture element to the picture element to be currently interpolated is 45°, if the direction value (NewDir(j+2)) of the picture element to be currently interpolated is –45°, and at the sane time if the direction value (NewDir(j+2)) of the picture element to be currently interpolated is different from the direction value (NewDir(j+3)) of the next picture element, the set direction value (OutDir (j+2)) of the picture element to be currently interpolated is determined as 0° (case 2').

As yet another case, if the set direction value (OutDir(j+1)) of the previous picture element to the picture element cc be currently interpolated is −43°, if tine direction value (NewDir(j+2)) of the picture element to be currently interpolated is 45°, and at the same time, if the direction value (NewDir(j+2)) of the picture element to be currently interpolated is different from the direction value (NewDir(j+3)) of the text picture element, the set direction value (OutDir (j+2)) of the picture element to be currently interpolated is determined as 0° (case 2').

As another case, if the direction value (NewDir(j+2)) of the picture element to be currently interpolated is 45°, if the direction value (NewDir(j+3) of the next picture element is −45°, and at the same time, if the set direction value (OutDir(j+1)) of the previous picture element to the picture element to be currently interpolated is different from the direction value (NewDir(j+2)) of the picture element to be currently interpolated, the set direction value (OutDir(j+2)) of the picture element to be currently interpolated is determined as 0° (case 2').

As another case, if the direction value (NewDir(j+2)) of the picture element to be currently interpolated is −45°, if the direction value (NewDir(j+3)) of the next picture element is 45°, and at the same time, if the set direction value (OutDir (j+1)) of the previous picture element to the picture element to be currently interpolated is different from the direction value (NewDir(j+2)) of the picture element to be currently interpolated, the set direction value (OutDir(j+2)) of the picture element to be currently interpolated is determined as 0° (case 2').

Also, in case of any other cases except the above-described cases 1∝ and 2', the set direction value (OutDir (j+2)) of the picture element to be currently interpolated is determined as the direction value calculated in the first program module (case 3').

The spatial interpolator 300 of the present invention may have another program module composed of a larger number of hierarchical structures, in addition to the first and second program modules, for the purpose of obtaining more precise results. In other words, tie present invention divides the direction value into three values of 0°, 45° and −45°, but may divide it into three or more values. In addition, the size of the observation window may be varied. If the observation window is enlarged, the number of direction valves (Dir) required in the first program module increases. In this case, the direction value is divided by smaller direction value number and thus, the first program module can be hierarchically structured.

These program modules are used to determine the direction value of the picture element to be currently interpolated in consideration of the direction value of the previous picture element and the direction value of the next picture element on the basis of the picture element to be currently interpolated. And, according to the present invention, the gradient is obtained by using the sobel mask, but may be obtained by using prewitt, compass and Roberts operator as existing methods or different methods.

If the direction value (OutDir(j+2)) of the picture element to he currently interpolated in the second program module has been determined, the spatial interpolator 300 calculates the interpolation value of the picture element based upon the determined direction value. If the picture element to be currently is interpolated based upon the direction values of 0°, 45° and −45°, a method for interpolating the picture element is carried out by the following third program module.

∗ Third Program Module ∗ if $n(OutDir\ 0°) > 2$

Final $Dir(j) = 0°$ else if $n(Out\ Dir\ 45°) > 2$,

Final $Dir(j) = 45°$ else if $n(Out\ Dir\ -45°) > 2$,

Final $Dir(j) = -45°$ else,

Final $Dir(j) = Out\ Dir(j)$ end if if Final $Dir(j) = -45°$ $$P_s(i, j, n) = \frac{P(i-1, j-1, n) + P(i+1, j+1, n)}{2}$$

else if Final $Dir(j) = 45°$, $$P_s(i, j, n) = \frac{P(i-1, j+1, n) - P(i+1, j-1, n)}{2}$$

else, $$P_s(i, j, n) = \frac{P(i-1, j, n) + P(i-1, j, n)}{2}$$

end if

Now, an explanation of the operation principles of the third program module will be hereinafter discussed If the number of the picture elements having a direction value of 0° exceeds 2, the set direction value (Final Dir(j)) of the picture element to be currently interpolated is 0°. If the number of the picture elements having a direction value of 45°, the set direction value (Final Dir(j;) of the picture element to be currently interpolated is 45°. If the number of the picture elements having a direction value of −45°, the set direction value (Final Dir(j)) of the picture element to be currently interpolated is −45°.

Figure 8:
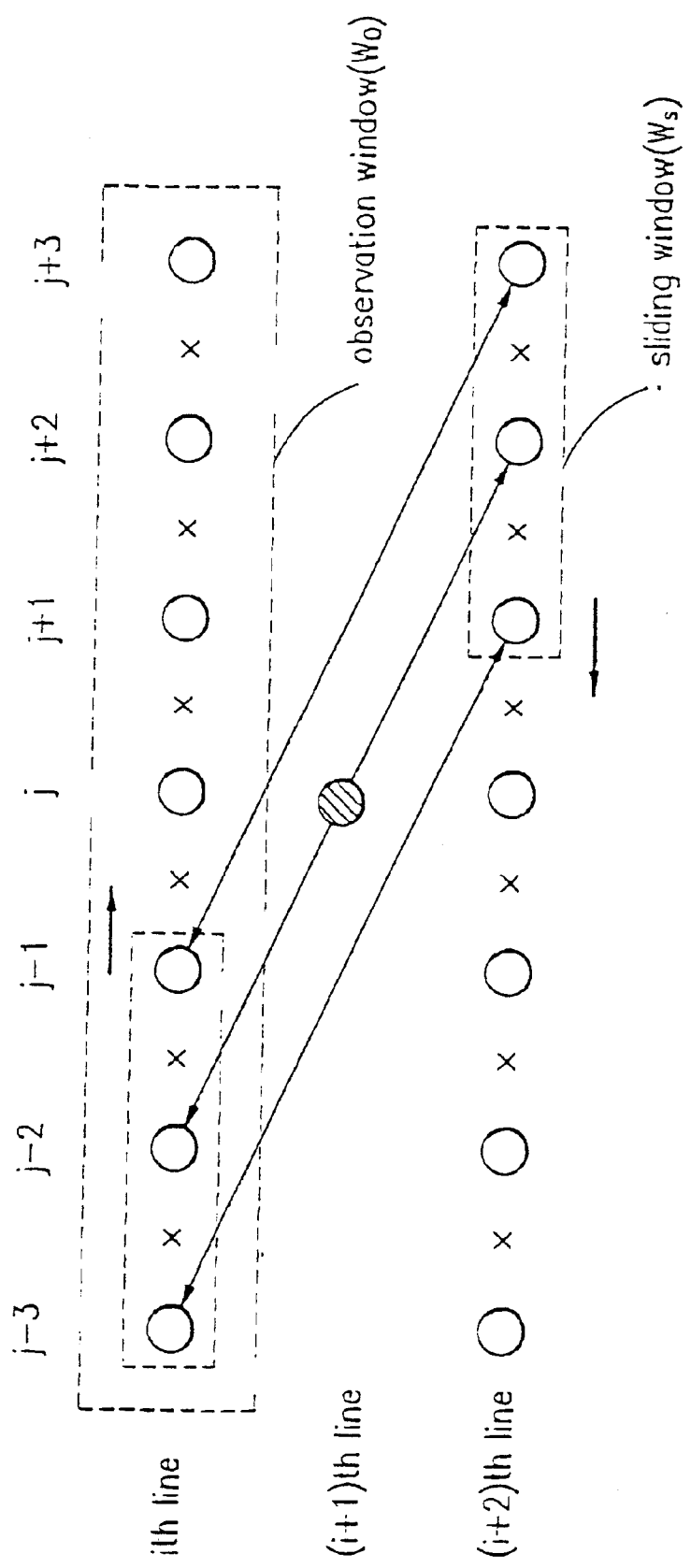
FIG. 8 is an exemplary view illustrating an operation of detecting the motion of image in a filtered signal by means of a motion estimator of a spacial interpolator.
Figure 14:
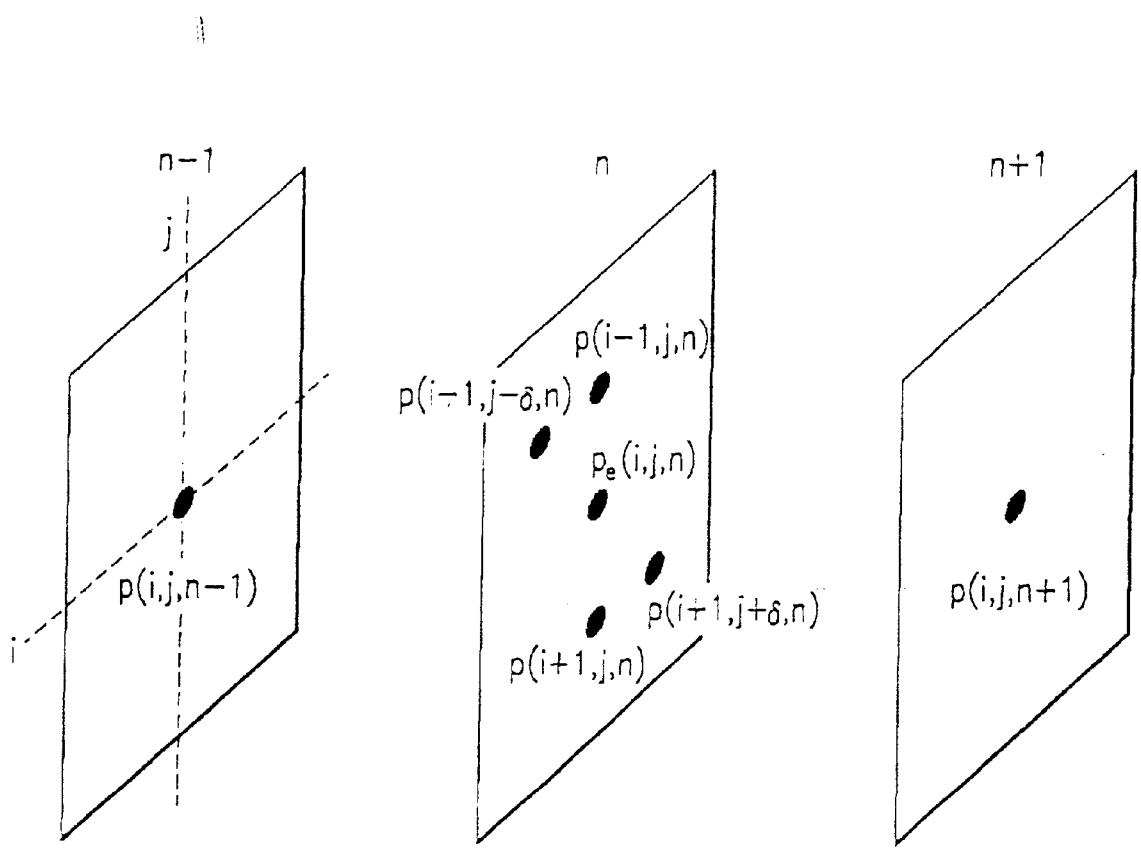
FIG. 14 is an exemplary view illustrating the picture elements and field data that are median-filtered for determining the interpolation value.

In case of any other cases except the above cases, the set direction value (Final Dir(j)) of the picture element to be currently interpolated is the set direction value (OutDir(j)) of the picture element (jth picture element) to be currently interpolated calculated from the second program module, If the final direction value (Final Dir(j)) of the picture element (jth picture element) to be currently interpolated is −45° in the above step, the picture element (i−1,j−1) on the left upper line and the picture element (i+1, j+1) on the right lower line in a diagonal direction of the picture element (P_e(i,j,n)) to be currently interpolated are averaged $$\left(\frac{P(i-1, j-1, n) + P(i+1, j+1, n)}{2}\right),$$

as shown in FIGS. 8 and 14, thereby interpolating the picture element P_e(i,j,n) to be currently interpolated.

Also, if the final direction value (Final Dir(j)) of the picture element (jth picture element) to be currently interpolated is 45° in the above step, the picture element (i−1, j+1) on the right upper line and the picture element on the left lower line in a diagonal direction of the picture element (P_e(i,j,n)) to be currently interpolated are averaged $$\left( \frac{P(i-1, j+1, n) + P(i+1, j-1, n)}{2} \right),$$

as shown in FIGS. 8 and 14, thereby interpolating the picture element $P_e$ (i,j,n) to be currently interpolated.

Meanwhile, in case of any other cases except that the final direction value (Final Dir(j)) of the picture element (jth picture element) to be currently interpolated is −45° or 45°, the picture element (i−1,j) on and the picture element (i+1,j) below the picture element ($P_e$(i,j,n)) to be currently interpolated are averaged $$\left( \frac{P(i-1, j, n) + P(i+1, j, n)}{2} \right),$$

as shown in FIGS. 8 and 14, thereby interpolating the picture element $P_e$(i,j,n) to be currently interpolated.

The method for calculating the edge direction value of the picture element by using the gradient and rule is summarized as follows:

First, the picture element values in the vicinity of the edge of the observation window where the picture element to be interpolated is contained are detected. Then, the gradient of the observation window, where the picture element to be interpolated is contained, is calculated based upon, the variation amount of the picture element values in the vicinity of the edge. Next, the edge direction of the picture element is sensed based upon the gradient of the observation window, thereby calculating the direction value of the picture element.

At this time, the calculation of the gradient of the observation window is carried out by shifting the observation window at predetermined intervals and continuously detecting temporary gradient in accordance with the variation amount of the picture elements positioned in the vicinity of the edge of the shifted observation window. The temporary gradient values are calculated by the above mathematical expressions (6) and (7). Next, the temporary gradient values are substituted for the first to third program modules to determine the edge direction, of the picture element to be interpolated, thereby setting the interpolation value based upon the edge direction.

Thereafter, the picture element values adjacent to the picture element for which the edge direction is detected are linearly interpolated, thereby extracting the interpolation value.

A schematic explanation of the region matching method is given as follows:

(Region Matching Method)

Figure 7:
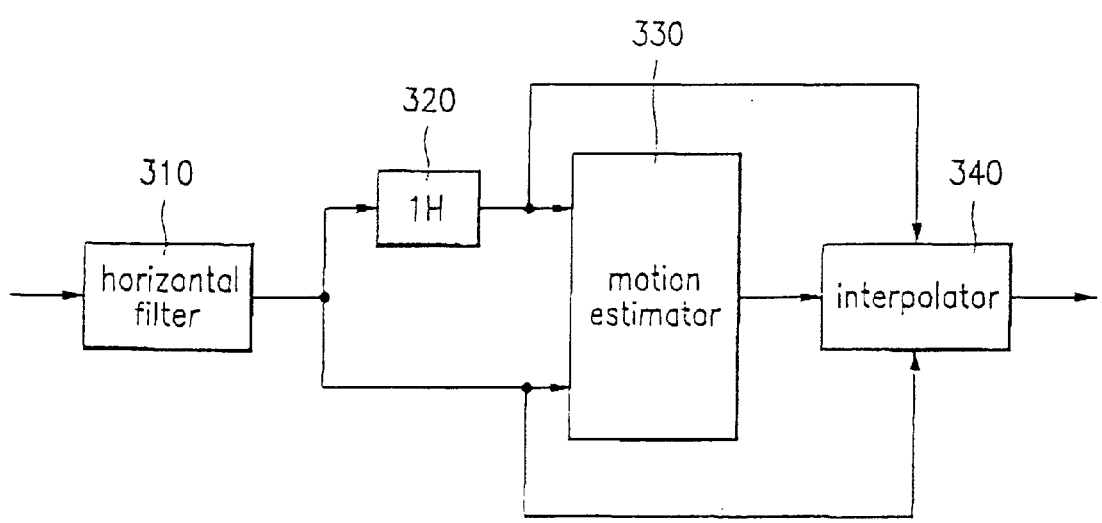
FIG. 7 is a block diagram illustrating the components of the first filter of the present invention.

The region matching method is used to extract the interpolation value, based upon the characteristic that the picture element values of the edge of the area to be interpolated are continuous along the edge direction. As shown in FIG. 7, the spatial interpolator 300 for extracting the interpolation value by using the region matching method comprises a horizontal filter 310 for eliminating the noise components of the input signal, a signal delayer 320 for delaying the filtered signal by one horizontal period, a motion estimator 330 for detecting the edge direction in the filtered signal and an interpolator 340 for outputting the interpolation value.

The operation of detecting tie edge direction in the corresponding picture element in the filtered signal by means of the motion estimator 330 of the spatial interpolator 300 is shown in FIG. 8.

First, the picture element values existing within sliding windows on an arbitrary edge where the picture element to be interpolated is contained are detected. At this time, the size of the sliding window should be appropriately adjusted, depending upon the system.

Then, while the upper and lower sliding windows are shifted at the predetermined intervals in the opposite direction to each other, the difference values between the corresponding picture elements within the upper and lower sliding windows in the various edge directions corresponding to the shifting are continuously detected. At the same time, the edge direction in which the picture element to be interpolated is contained is sensed, based upon the variation amount of the picture element values continuously detected.

First, if the line to be interpolated is a kth line, a predetermined sliding window is set on k+1th and k−1th lines, respectively, within, the predetermined observation window. And, the sliding window on the k=1th line shifts from left to right and the sliding window on the k+1th lice shifts from right to left. The difference values of the picture elements positioned in the diagonal direction to each sliding window are detected and added, thereby calculating the variation amount of the picture element values. At this time, the present invention sets the shifting intervals o the sliding window to a half unit of the interval of adjacent picture element, but may set them to more precise intervals, for example, ¼, ⅛ and so on.

At the time, the picture element values of the adjacent picture elements in the observation window are linearly interpolated and the linearly interpolated picture element values are set as the values between the adjacent picture elements in the observation window. The difference values in the picture element values of the picture elements positioned within the sliding window are calculated by the following mathematical expression (9). The size of the sliding window can be arbitrarily set according to the application.

$$Diff_n^{1, j+2} - \sum_{n=\frac{-k}{2}}^{\frac{k}{2}} |P_{i, j+m+n} - P_{i+2, j+n+m}| \tag{9}$$

At this time, the reference symbol 'm' can be defined to the diagonal direction to be obtained according to the application. For example, the 'm' is in a range of −3 to +3, which is defined by the shifting intervals of the sliding window.

Next, a minimum value is obtained from the calculated values $Diff_m^{1, j+2}$ and a value $m_{min}$ for the minimum value of the values $Diff_m^{i, j+2}$ is extracted. For instance, in the case where the 'm' is in a range of −3 to +3 and the shifting intervals of the sliding window are defined to a half picture element, the interpolation value Ps is calculated by the following mathematical expressions (10) to (18).

First, the picture element values of the picture elements contained in the sliding window are linearly interpolated between the adjacent picture elements and the linearly interpolated picture element values are inserted between the adjacent picture elements. The difference values of the picture element values in the picture elements between the upper and lower sliding windows are calculated and added. Then, the minimum value is obtained from the added difference values and the interpolation value Ps existing in the center of the upper and lower sliding windows on the diagonal line on which the minimum value has been calculated is calculated.

For example, if the value $m_{min}$ which is a minimum valve of the values calculated by the mathematical expression (9)

is −3, the interpolation value Ps is calculated by the following mathematical expression (10).

$$Ps = \frac{(P_{(i,j-3,n)} + P_{(i+2,j+3,n)})}{2} \tag{10}$$

If the value $m_{min}$ which is a minimum value of the values calculated by the mathematical expression (9) is −5/2, the interpolation value Ps is calculated by the following mathematical expression (11).

$$Ps = \frac{\left(P_{(i,j-\frac{5}{2},n)} + P_{(i+2,j+\frac{5}{2},n)}\right)}{2} = \frac{\left(P_{(i,j-3,n)} - P_{(i,j-2,n)} + P_{(i+2,j-2,n)} + P_{(i+2,j+3,n)}\right)}{4} \tag{11}$$

If the value $m_{min}$ which is a minimum value of the values calculated by the mathematical expression (19) is −2, the interpolation value Ps is calculated by the following mathematical expression (12).

$$PS = \frac{(P_{(i,j-2,n)} + P_{(i+2,j+2,n)})}{2} \tag{12}$$

If the value $m_{min}$ which is a minimum value of the values calculated by the mathematical expression (9) is −3/2, the interpolation value Ps is calculated by the following mathematical expression. (13).

$$Ps = \frac{\left(P_{(i,j-\frac{3}{2},n)} + P_{(1-2,j-\frac{3}{2},n)}\right)}{2}$$
$$= \frac{(P_{(1,j-2,n)} + P_{(i,j-1,n)} + P_{(i+2,j+1,n)} + P_{(i+2,j+2,n)})}{4} \tag{13}$$

If the value $m_{min}$ which is a minimum value of the values calculated by the mathematical expression (9) is −1, the interpolation value Ps is calculated by the following mathematical expression (14).

$$Ps = \frac{(P_{(i,j-1,n)} + P_{(i+2,j+1,n)})}{2} \tag{14}$$

If the value $m_{min}$ which is a minimum value of the values calculated by the mathematical expression (9) is −½, the interpolation value Ps is calculated by the following mathematical expression (15).

$$Ps = \frac{\left(P_{(i,j-\frac{1}{2},n)} + P_{(1+2,j+\frac{1}{2},n)}\right)}{2}$$
$$= \frac{(P_{(1,j-1,n)} + P_{(i,j,n)} + P_{(i+2,j,n)} + P_{(i+2,j+1,n)})}{4} \tag{15}$$

If the value $m_{min}$ which is a minimum value of the values calculated by the mathematical expression (9) is 0, the interpolation value Ps is calculated by the following mathematical expression (16).

$$Ps = \frac{(P_{(i,j,n)} + P_{(i+2,j,n)})}{2} \tag{16}$$

If the value $m_{min}$ which is a minimum value of the values calculated by the mathematical expression (9) is ½, the interpolation value Ps is calculated by the following mathematical expression (17).

$$s = \frac{\left(P_{(i,j+\frac{1}{2},n)} + P_{(i+2,j-\frac{1}{2},n)}\right)}{2}$$
$$= \frac{(P_{(i,j+1,n)} + P_{(i,j,n)} + P_{(i+2,j,n)} + P_{(i+2,j-1,n)})}{4} \tag{17}$$

If the value $m_{min}$ which is a minimum value of the values calculated by the mathematical expression (9) is 1, the interpolation value Ps calculated by the following mathematical expression (18).

$$Ps = \frac{(P_{(i,j+1,n)} - P_{(i+2,j-1,n)})}{2} \tag{18}$$

As calculated by the above expression any other value $m_{min}$ except the values calculated in the above can be obtained in the sane manner. That is, $$Ps(m_{\min} = k) = \frac{(P_{(i,j+k,n)} + P_{(i+2,j-k,n)})}{2}.$$

At this time, if the value $m_{min}$ which is a minimum value of the values calculated by the mathematical expression (9) is two or more, on the basis of the value m of '0' the interpolation value calculated at the near position to the valve m is primarily determined. As a rare case, if two values $m_{min}$ are calculated at the same distance position on the bass of the value m of '0' the picture element value positioned at the center of the sliding windows on which the two values $m_{min}$ exist is filtered, thereby calculating the interpolation value.

However, if the added value $\text{Diff}_{mm}^{i,j+2}$ of the difference values of the picture element values between the sliding windows in the diagonal direction is over a predetermined threshold value, the interpolation value is the same as upon a linear interpolation in a vertical direction, the case where the value $m_{min}$ is 0.

In the preferred embodiment of the present invention, the observation window for one line contains seven picture elements, but the dimension of the observation window and the number of picture elements may be all increased. Of course, the dimension of the sliding window within the observation window and the number of picture elements contained therein may be varied. Therefore, the shifting of the sliding window is not limited to the half picture element as discussed above, but may be arbitrarily set to ⅓, ¼ and so on of the picture element intervals.

Figure 13:
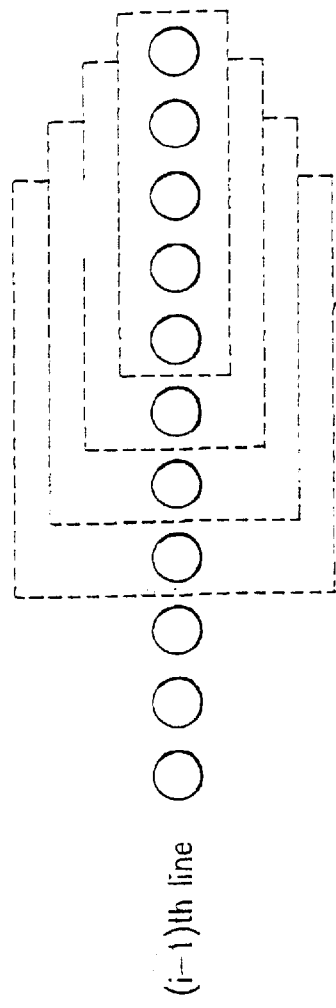
FIG. 13 is an exemplary view illustrating an operation of detecting an interpolation value of the mapped picture elements in the edge direction.
Figure 13:
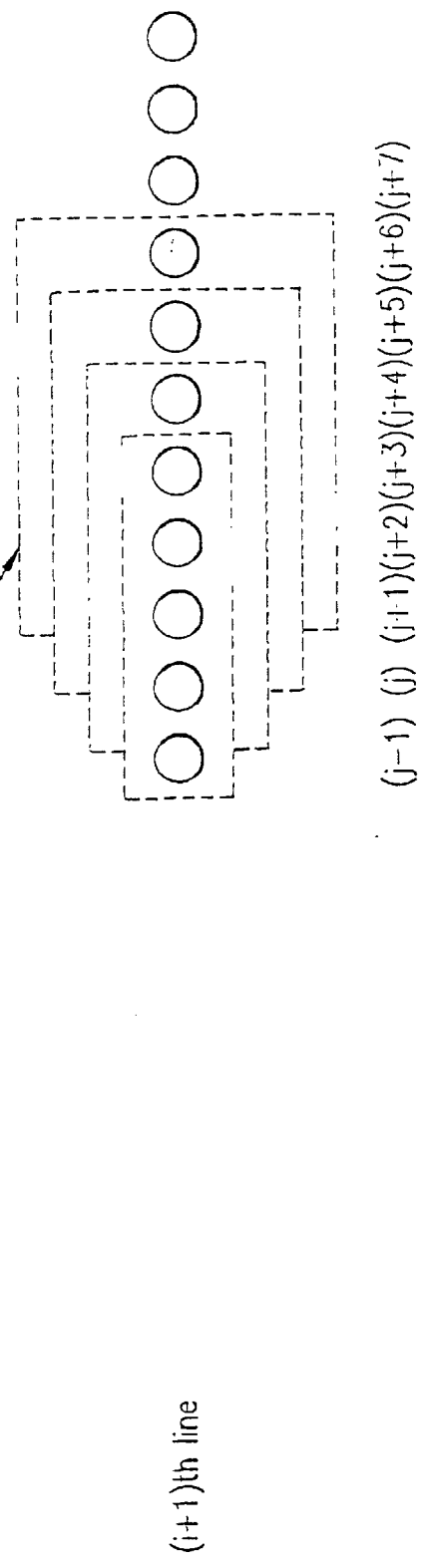

Alternatively, by combining the region matching method with the direction extraction method by gradient and rule, the interpolation value is determined based upon the picture element value for which the edge direction is detected and the adjacent picture elements, unlike the region matching method. If the edge direction determined by the edge direction detecting method by the gradient and rule is −45°, the interpolation value is determined based upon the picture element values in the diagonal direction from the position of the picture element to be interpolated and the adjacent picture element values thereof, as shown in FIG. 13.

The reason is why the spatial interpolator 300 of the present invention firstly uses the direction detecting method by gradient and rule and secondly uses the region matching method, in order to determine the picture element value to be interpolated, is given as follows.

The region matching method has simple operation principles and can detect a precise interpolation value but a defect that the operation quantity required for detecting one edge direction is relatively large. Contrarily, the direction detecting method by the gradient and rule has an advantage that the global edge direction can be easily detected but has a defect that the edge direction can not be precisely detected.

By this reason, the present invention selects and uses the advantages of the two methods, while removing the defects thereof. That is, only when the linear interpolation value of the picture element for which the edge direction has been detected is extracted, the region matching method is adopted, and when the edge direction where the picture element to be really interpolated is contained is detected, the direction detecting method by the gradient and rule, as shown in FIG. 9, is adopted.

Thereafter, the median filtering for the adjacent picture elements to the picture element(Pe(i, j, n)) to be interpolated within a current field (nth field), particularly the picture element values of two picture elements(P(i−1, j−δ, n), P(i+1, j+δ,n)) in the diagonal direction used for the linear interpolation, the picture element value $$\left(\frac{p(i-1, j-\delta, n) + P(i-1, j+\delta, n)}{2}\right)$$

of the interpolated position, the picture element value (P(i, j, n−1)) of the interpolated position within the previous field (n−1th field), and the picture element value(P(i, j, n+1)) of the interpolated position within the next field (n+1th field), respectively is carried out. A method for carrying out the median filtering is embodied by the following mathematical expression (19).

$$P'_e(i, j, n) = \text{median}\{p(i, j, n-1), p(i-1, j-\delta, n),$$
$$\frac{(p(i-1, j-\delta, n) + p(i+1, j+\delta, n))}{2},$$
$$p(i+1, j+\delta, n), p(i, j, n+1)\}$$

After the median filtering, the noise components of the picture element values are eliminated.

So as to obtain a more smooth and stable interpolation value within the current field (nth field), the median filtering is carried out in such a manner that a predetermined extra weight value is inserted to the picture element values interpolated within the field in accordance with the calculated edge direction. The method for carrying out the median filtering having the extra weight value is embodied by the following mathematical expression (20).

$$P'_e(i, j, n) = \text{median}\{p(i, j, n-1), p(i-1, j-\delta, n),$$
$$\frac{(p(i-1, j-\delta, n) + p(i+1, j+\delta, n))}{2},$$
$$\frac{(p(i-1, j-\delta, n) + p(i+1, j+\delta, n))}{2},$$
$$p(i+1, j+\delta, n), p(i, j, n+1)\}$$

In the interpolated picture element $P'_e$ (i, j, n) for which the median filtering is carried out is determined by the different picture elements that are distant from the position to be currently interpolated or exists in a vary fast motion state, it has a remarkably different value from the adjacent picture elements.

To prevent such the result, the spatial interpolator 300 of the present invention carries out the median filtering with a predetermined program, based upon the adjacent picture elements in a vertical direction from the position of the picture element to be interpolated within the field. Such the median filtering program is executed as follows:

* Vertical Direction Median Filtering Program *
if (|δ|<m) then
Pe(i, j, n)=P'e(i, j, n)
else
(Pe(i, j, n)=median{P(i−1, j, n), P'e(i, j, n), P(i+1, j, n)}
end if An explanation of the operation of the vertical direction median filtering will be discussed hereinafter.

If the distance from the position of the picture element to be currently interpolated is less than the value m determined by the mathematical expression (13), the interpolated picture element value obtained by the mathematical expression (19) or (20) is determined as the interpolation value.

However, if the distance from the position of the picture element to be currently interpolated is not less than the value m determined by the mathematical expression (18), the interpolation value is determined as the median filtered value, based upon the interpolated picture element value obtained by the mathematical expression (19) or (20) and the picture element values of the adjacent picture elements in the vertical direction from the picture element to be interpolated.

The temporal interpolator 400 averages the picture element values of the previous field data and the next field data to the area where the line interpolation is carried out, thereby extracting the field average value. For example, if a ith line is interpolated to newly form the nth field image, the temporal interpolator 400 averages the picture element values of the n−1th field data and the n+1th field data having the image data of the ith line, thereby extracting the field average value. The field average value extracted from the temporal interpolator 400 is calculated by the following mathematical expression (21).

$$P_t(i, j, n) = \frac{P(i, j, n-1) + P(i, j, n+1)}{2} \quad (21)$$

The soft switch 500 mixes and outputs the interpolation value within the field, for which the edge direction is considered, outputted from the spatial interpolator 300 and the field average value outputted from the temporal interpolator 400, based upon the brightness difference and the brightness profile pattern difference calculated by the mathematical expressions (9) to (18) in the motion determination part. The soft switch 500 outputs the value calculated by the following mathematical expression (22).

$$P(i, j, n)=\alpha P_\theta(i, j, n)+(1-\alpha)P_t(i, j, n) \quad (22)$$

At this time, α is the motion value outputted from the motion expander, wherein 0α1.

The deinterlacing device of the present invention further comprises the vertical line converter 800 which converts the number of vertical lines of the current field screen for generating the interpolated lines matched in the display, based upon the interpolated value outputted from the soft switch 500 and the field data values stored in the field memory 100.

The vertical line converter 800 converts the number of vertical lines by using the field data received currently and interpolated field data. However, in case where only the deinterlaced field data is needed and the line conversion is not required, the vertical line converter 800 directly passes the output value from the soft switch 500.

The deinterlacing method according to the present invention can be briefly summarized as follows.

First, the m field data continuously inputted in the interlacing manner are stored. The picture element values in the predetermined area where the picture element to be interpolated is contained in the stored field data are detected.

The edge direction of the picture element values on the predetermined area is extracted. At this time, the method for extracting the edge direction of the picture element values is embodied by using the region matching method and the direction detection method by the gradient and rule, as previously discussed.

Then, the interpolation value of the picture element is calculated based upon the edge direction of the picture element values. This is obtained by using the mathematical expression (20).

Finally, the field data of the picture element to be currently interpolated is interpolated by using the calculated interpolation value, such that the interlacing signal is converted into the deinterlacing signal.

As clearly mentioned above, a deinterlacing device and method according to the present invention is capable of carrying out the field interpolation in consideration of the motion of image, such that it can provide a more vivid quality of image, when compared as conventional line repetition, inter-field interpolation without motion-compensation and intra-field interpolation methods. Additionally, the median filtering after the interpolation ensures an excellent quality of image and a precise interpolation according to the motion. Also, when compared with the existing Bernard Patent and Faroudja Patent, the present invention can improve a quality of image, in a simple circuit configuration.

It will be apparent to those skilled in the art that various modifications and variations can be made in a deinterlacing device and method of the present invention without departing from the spirit or scope of the invention. Thus, it is intended that the present invention cover the modifications and variations of this invention provided they come within the scope of the appended claims and their equivalents.

What is claimed is:

1. A deinterlacing device comprising:
   a field memory for storing m continuous field data including a nth field data, n−1th field data, and n+1th field data among a plurality of field data for an image;
   a motion determination part for detecting picture element values and brightness profile pattern difference values in specific lines existing among the field data stored in said field memory to calculate a motion value of a moving picture;
   a spatial interpolator for calculating a variation direction of picture element values on an area to be interpolated in the nth field data to output a direction value;
   a time interpolator for averaging the picture element values on the area to be interpolated in the n−1th field data and the picture element values on the area to be interpolated in the n+1th field data to output a picture element average value; and
   a soft switch for mixing the direction value from said spatial interpolator and the picture element average value from said time interpolator, based upon the motion value determined in said motion determination part to output the mixed result,
   wherein said motion determination part comprises:
      a brightness difference and brightness profile pattern difference detector for calculating the brightness difference and the brightness profile pattern difference in a field data; and
      a brightness difference and brightness profile pattern difference combiner for carrying out a mapping to a predetermined set value, if the brightness difference and the brightness profile pattern difference are over a predetermined threshold value, to measure the motion value.

2. The deinterlacing device in claim 1, further comprising:
   a median filter for grouping the motion values calculated in said motion determination part;
   a motion expander for expanding the motion value from the picture element having motion on the specific line to adjacent picture elements in accordance with the motion value grouped in said median filter to output an expanded motion value to said soft switch; and
   a vertical line converter for converting a number of vertical lines on the nth field screen, based upon an output value of said soft switch and the field data values stored in said field memory.

3. The deinterlacing device of claim 1, wherein said spatial interpolator detects an edge direction of a picture element to be currently interpolated, based upon the field data values stored in said field memory and averages picture element values of adjacent picture elements to the picture element for which the edge direction has been detected to determine a picture element value to be interpolated, and
   wherein said spatial interpolator carries out a median filtering for the adjacent picture elements vertically to the picture element to be interpolated within the same field as the picture element to be interpolated and outputs an interpolation value.

4. The deinterlacing device of claim 1, wherein said spatial interpolator comprises a filter for median-filtering a picture element value to be interpolated and picture element values in a diagonal direction from the position of the picture element to be interpolated within a current field, and wherein said filter carries out the median filtering with a predetermined extra weight value in an edge direction of the picture element to be interpolated.

5. A deinterlacing device comprising:
   a field memory for storing n−2th to n+1th field data among a plurality of field data for an output image;
   a brightness difference and brightness profile pattern difference detector for calculating a brightness difference and a brightness profile pattern difference in a field data;
   a brightness difference and brightness profile pattern difference combiner for carrying out a mapping to a predetermined set value, if the brightness difference and the brightness profile pattern difference are over a predetermined threshold value, to measure a motion value;
   a median filter for eliminating noise components contained in the motion value and grouping areas where the motion value exists;
   a motion expander for expanding the motion value from the grouped areas to adjacent picture elements;
   a spatial interpolator for determining a picture element to be interpolated in accordance with the motion value;

a time interpolator for averaging picture element values of an n−1th field on the same position as the picture element to be interpolated on an nth field and picture element values of the n+1th field on the same position as the picture element to be interpolated on an nth field, to thereby output a picture element average value;

a soft switch for mixing the picture element value from said spatial interpolator and the picture element average value from said time interpolator, based upon the motion value expanded in said motion expander to thereby output the mixed result; and a vertical line converter for converting the number of vertical lines on the nth field screen, based upon the output value of said soft switch and the field data values stored in said field memory.

6. The deinterlacing device of claim 5, wherein said spatial interpolator detects an edge direction of a picture element to be currently interpolated, based upon the field data values stored in said field memory and averages picture element values of adjacent picture elements to the picture element for which the edge direction has been detected to thereby determine a picture element value to be interpolated; and wherein said spatial interpolator carried out a median filtering for the adjacent picture elements vertically to the picture element to be interpolated within the same field as the picture element to be interpolated and outputs an interpolation value.

7. The deinterlacing device of claim 6, wherein said spatial interpolator further comprises a filter for median filtering a picture element value to be interpolated and picture element values in a diagonal direction from the position of the picture element to be interpolated within the current field; and wherein said filter carries out the median filtering with a predetermined extra weight value in an edge direction of the picture element to be interpolated.

8. A deinterlacing method comprising:

storing m field data corresponding to an interlacing type broadcasting program image;

detecting picture element values on a predetermined first area in which a picture element to be interpolated is contained in a field data;

detecting a variation direction of said picture element values on the predetermined first area;

calculating an interpolation value, based upon the variation direction of said picture element values on the predetermined first area; and interpolating a current field data with the calculated interpolation value.

9. The deinterlacing method of claim 8, wherein detecting the variation direction of said picture element values on the predetermined first area comprises:

detecting picture element values in a vicinity of an edge of a predetermined first area in which the picture element to be interpolated is contained;

shifting the first area at predetermined intervals to continuously detect said picture element values on the predetermined first area in the vicinity of a shifted edge;

calculating a variation amount of said picture element values on the predetermined first area continuously detected; and sensing the variation direction of said picture elements value, based upon the variation amount of the picture element values.

10. The deinterlacing method of claim 9, wherein continuously detecting the picture element value comprises:

setting a first observation window on a part of an upper line of lines in which the picture element to be interpolated is contained and setting a second observation window on a part of a lower line; and shifting the first and second observation windows at predetermined intervals to detect the picture elements on an edge of each observation window.

11. The deinterlacing method of claim 10, wherein said first and second observation windows are shifted in opposite directions.

12. The deinterlacing method of claim 8, wherein interpolating the current field data with the calculated interpolation value comprises:

linearly interpolating each of picture element values contained in a predetermined second area in which the picture element to be interpolated is contained between adjacent picture elements;

replacing the picture element value linearly interpolated between the adjacent picture elements;

calculating difference values between two picture element values in picture elements within the predetermined second area;

calculating a minimum value of the difference values;

setting an interpolating area in which the two picture elements having the minimum value are contained; and calculating an average value of all picture element values contained in the interpolating area as the interpolation value and interpolating the current field data with the calculated interpolation value.

13. The deinterlacing method of claim 8, wherein extracting the variation direction of said picture element values on the predetermined first area comprises:

detecting picture element values on an edge of a third area where the picture element to be interpolated is contained;

calculating gradient of the picture element values on the edge of the third area, based upon the variation amount of the picture element values in the vicinity of the edge; and sensing the variation direction of said picture element values on the predetermined first area, based upon the gradient.

14. The deinterlacing method of claim 13, wherein calculating the gradient comprises:

inputting picture element values of picture elements positioned on upper and lower lines of a line where the picture element to be interpolated is contained;

calculating difference values between the picture element values of a part of the upper line and the picture element values of a part of the lower line;

comparing a maximum value in the difference values with a predetermined threshold value; and setting the variation direction of said picture element values on the predetermined first area as 0° if the maximum value is less than the predetermined threshold value, and otherwise, calculating a gradient of the picture element to be interpolating using a sobel mask containing picture element values from which the maximum value is calculated, where said sobel mask has a 3×3 picture element size.

15. The deinterlacing method of claim 14, wherein calculating the gradient of the picture element to be interpolated comprises:

carrying out a partial differentiation for a picture element value of the picture element to be interpolated in a direction of a 'x' axis to thereby calculate a partial differentiation value on the 'x' axis;

carrying out a partial differentiation for a picture element value of the picture element to be interpolated in a direction of a 'y' axis to thereby calculate a partial differentiation value on the 'y' axis; and calculating an arc tangent of a value obtained by dividing the partial differentiation value on the 'y' axis by the partial differentiation value on the 'x' axis.

16. The deinterlacing method of claim 13, wherein sensing the variation direction of the picture element values comprises:

setting an angle obtained by a division of a gradient at 90° as the edge direction if a gradient of the picture element positioned on the edge is over 0°; and otherwise setting an angle obtained by a division of a gradient at −90° as the edge direction.

17. The deinterlacing method of claim 13, wherein sensing the variation direction of the picture element values comprises:

calculating a direction value of each picture element within the third area; and estimating direction values of the picture elements positioned horizontally adjacent to the picture element to be interpolated, based upon the direction value of each picture element.

* * * * *